US012606164B2

(12) United States Patent
Velten

(10) Patent No.: US 12,606,164 B2
(45) Date of Patent: Apr. 21, 2026

(54) DRIVING ASSISTANCE SYSTEM

(71) Applicant: Bayerische Motoren Werke Aktiengesellschaft, Munich (DE)

(72) Inventor: Thomas Velten, Siegsdorf (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 132 days.

(21) Appl. No.: 18/562,623

(22) PCT Filed: Apr. 21, 2022

(86) PCT No.: PCT/EP2022/060482
§ 371 (c)(1),
(2) Date: Nov. 20, 2023

(87) PCT Pub. No.: WO2022/242981
PCT Pub. Date: Nov. 24, 2022

(65) Prior Publication Data
US 2024/0270248 A1     Aug. 15, 2024

(30) Foreign Application Priority Data

May 21, 2021    (DE) ..................... 10 2021 113 344.0

(51) Int. Cl.
B60W 30/16              (2020.01)
(52) U.S. Cl.
CPC ....... B60W 30/16 (2013.01); B60W 2554/802 (2020.02); B60W 2720/106 (2013.01); B60W 2754/30 (2020.02)
(58) Field of Classification Search
CPC ............. B60W 30/16; B60W 2754/30; B60W 2554/802; B60W 2720/106
See application file for complete search history.

(56) References Cited

U.S. PATENT DOCUMENTS

2019/0217861 A1     7/2019  Kurahashi
2019/0248367 A1*    8/2019  Knitt ................... B60W 10/184
(Continued)

FOREIGN PATENT DOCUMENTS

DE      10 2019 201 141 A1     8/2019
DE      10 2019 200 209 A1     7/2020
(Continued)

OTHER PUBLICATIONS https://www.youtube.com/watch?v=qoj8Pa2wi0A, Matlab, Dec. 2014 (Year: 2014).*

(Continued)

*Primary Examiner* — Todd Melton
*Assistant Examiner* — Oliver Tan
(74) *Attorney, Agent, or Firm* — Crowell & Moring LLP

(57)          ABSTRACT

A driving assistance system automatically controls the longitudinal guidance of a motor vehicle according to a desired acceleration in driving situations characterized by multiple objects travelling level with each other in the same lane as and directly in front of the motor vehicle. A first acceleration controller determines a first desired acceleration based on a first desired distance from the first object. A second acceleration controller determines a second desired acceleration based on a second desired distance from the second object. The second acceleration controller also determines a third desired acceleration based on a third desired distance from a third object in a different lane and/or changing to the same lane. The desired acceleration is output based on the first desired acceleration, the second desired acceleration, and the third desired acceleration.

10 Claims, 2 Drawing Sheets

(56) References Cited

U.S. PATENT DOCUMENTS

| | | | |
|---|---|---|---|
| 2019/0313355 A1 | 10/2019 | Alsina et al. | |
| 2020/0333414 A1 | 10/2020 | Hilbert et al. | |
| 2022/0073071 A1* | 3/2022 | Grelaud | B60W 60/001 |

FOREIGN PATENT DOCUMENTS

| | | |
|---|---|---|
| DE | 11 2018 005 415 T5 | 7/2020 |
| DE | 10 2019 214 121 A1 | 3/2021 |
| EP | 3 335 955 A1 | 6/2018 |
| EP | 3 800 099 A1 | 4/2021 |
| JP | 2007-001383 A | 1/2007 |
| JP | 2019-123385 A | 7/2019 |
| JP | 2019-137392 A | 8/2019 |

OTHER PUBLICATIONS

International Search Report (PCT/ISA/210) issued in PCT Application No. PCT/EP2022/060482 dated Aug. 18, 2022 (2 pages).
German-language Search Report issued in German Application No. 10 2021 113 344.0 dated Jan. 4, 2022, with partial English translation (6 pages).
Korean-language Office Action issued in Korean Application No. 10-2023-7037060 dated Aug. 27, 2025 with English translation (10 pages).

* cited by examiner

DRIVING ASSISTANCE SYSTEM

BACKGROUND AND SUMMARY

This application is a 371 of International Application No. PCT/EP2022/060482, filed Apr. 21, 2022 which claims priority under 35 U.S.C. § 119 from German Patent Application No. 10 2021 113 344.0, filed May 21, 2021, the entire disclosure of which is herein expressly incorporated by reference.

The present invention relates to a driving assistance system for a motor vehicle, wherein the driving assistance system is designed to regulate a longitudinal guidance of the motor vehicle in an automated manner by outputting a setpoint acceleration to the motor vehicle, and a motor vehicle having the driving assistance system.

Generic driving assistance systems, which are designed to regulate a longitudinal guidance of a motor vehicle, in particular an automobile, in an automated manner by outputting a setpoint acceleration to the motor vehicle, are generally known from the prior art.

Such driver assistance systems can be part of a so-called adaptive cruise control, in which a cruise control system takes into consideration a distance to a preceding vehicle as a feedback and control variable in addition to a speed of the motor vehicle desired by the driver in a determination of a setpoint acceleration.

DE 10 2019 214 121 A1, US 2019/315355 A1, and DE 10 2019 200 209 A1 each describe generic driving assistance systems.

A method for operating a driver assistance system of an ego vehicle, in particular an ACC system, is described in DE 10 2019 214 121 A1, in which a manipulated variable is used for guidance of the ego vehicle, the setpoint value of which is ascertained on the basis of relative driving-dynamic measured values of the ego vehicle in relation to a preceding vehicle, wherein a time gap regulation between the ego vehicle and a first preceding vehicle and a time gap regulation between the ego vehicle and a second preceding vehicle takes place, a first manipulated variable requirement is derived from the first time gap regulation and a second manipulated variable requirement is derived from the second time gap regulation, and the final manipulated variable requirement is derived from an arbitration of the first and second manipulated variable requirement.

US 2019/315355 A1 describes a cruise control device for a vehicle having a target detection unit and a following control unit. The cruise control device comprises a determination unit designed to determine, during an execution of a following control, whether a small vehicle switching state in which a target to be followed is a small vehicle has occurred or not, a storage unit for an upper limit value designed to store, as the upper limit value, a target acceleration set before determination of the small vehicle switching state by the determination unit under a condition where the determination unit determines that the small vehicle switching state has occurred, and a target acceleration setting unit designed to set the target acceleration to a value equal to or lower than the upper limit value stored in the storage unit during a period until the following control performed for the switched small vehicle as the target to be followed ends.

DE 10 2019 200 209 A1 relates to a method for selecting the target object for an automatic distance control of a single-track motor vehicle, in which by means of a surroundings sensor system the presence of a second single-track motor vehicle preceding directly on the same lane and track motor vehicle preceding directly on the same lane and a third single-track motor vehicle preceding directly from the second single-track motor vehicle is detected, wherein the lateral offset of the second single-track motor vehicle and the third single-track motor vehicle in relation to the single-track motor vehicle is ascertained and the target object for the method for distance control is selected depending on at least one of the lateral offsets.

In general, the conventional generic driving assistance systems, in particular upon use in an automobile, are based on the design described hereinafter.

The conventional driving assistance system generally has a controller having three control instances having individually adapted parameterization. A first control instance, which can be designated as the "person in front controller" is provided for a direct target object (i.e., the closest object to the motor vehicle in its driving tube), a second control instance, which can also be designated as the "in front of the person in front controller" is provided for the vehicle in front of the vehicle in front (i.e., the next closest object to the motor vehicle in its driving tube), and a third control instance, which can also be designated as the "multi-object controller" is provided for neighboring lane objects and/or merging objects (i.e., objects which are located in the driving tube of the motor vehicle).

This has the disadvantage that in the case of two preceding objects driving adjacent to one another in the driving tube, such as motorcycles, the second control instance (so-called "in front of the person in front controller", see above) cannot be used deliberately for the second object, since a normal minimum distance between two passenger vehicles is presumed in the second control instance.

In particular in this case, in which multiple motorcycles are located in one lane in front of the motor vehicle and these motorcycles drive with little distance in relation to one another or overlapping/adjacent to one another, harmonic following of the motorcycle column therefore cannot be achieved using the conventional design in the case of spontaneous or erratic acceleration behavior, which is typical for motorcycles, and/or undesired or uneven braking can occur due to these usually dynamic motorcycle movements.

Against the background of this prior art, the object of the present invention is to specify a device which is capable of overcoming at least the above-mentioned disadvantages of the prior art.

Accordingly, a driving assistance system for a motor vehicle is described in which the driving assistance system is designed to control a longitudinal guidance of the motor vehicle in an automated manner by outputting a setpoint acceleration to the motor vehicle.

The driving assistance system can be a part of an adaptive cruise control or the adaptive cruise control itself.

The driving assistance system includes a first acceleration controller, which is designed to determine a first setpoint acceleration of the motor vehicle based on a predetermined first setpoint distance of the motor vehicle to a predetermined first object, which drives on the same lane as the motor vehicle and directly in front of the motor vehicle.

The first acceleration controller can also be designated as the person in front controller (see above) and therefore can correspond to the above-described first control instance.

The lane can be an actually physically formed lane and/or a driving tube, which is formed along a planned trajectory of the motor vehicle.

The driving assistance system includes a second acceleration controller, which is designed to determine a second setpoint acceleration of the motor vehicle based on a predetermined second setpoint distance of the motor vehicle to a predetermined second object, which drives on the same lane as the motor vehicle and at the level of the predetermined first object.

The second acceleration controller is moreover designed to determine a third setpoint acceleration of the motor vehicle based on a predetermined third setpoint distance of the motor vehicle to a predetermined third object, which drives on a different lane than the motor vehicle and/or changes from the other lane to the same lane as the motor vehicle.

The second acceleration controller can also be designated as the multi-object controller (see above) and therefore can correspond to the above-described third control instance.

In addition to the functional scope of the conventional multi-object controller, which is provided for neighboring lane objects or merging objects, the second acceleration controller is designed, however, to be used as the person in front controller for the second object located in the driving tube.

In other words, the driving assistance system includes at least two control instances having at least partially individually adapted parameterization. A control instance corresponding to the conventional first control instance, which can be designated as the "person in front controller", is provided for a direct target object (i.e., the closest object to the motor vehicle in its driving tube). A control instance corresponding to the conventional third control instance, which can also be designated as the "multi-object controller" is provided for neighboring lane objects or merging objects (i.e., objects which are not located in the driving tube of the motor vehicle) and additionally for the second object driving adjacent to the first object in the driving tube.

The driving assistance system includes a first setpoint acceleration determination unit, which is designed to determine the setpoint acceleration to be output to the motor vehicle based on the first, the second, and the third setpoint acceleration.

It is thus proposed here that the third control instance or the multi-object controller be used at least temporarily for the further or second object in the driving tube.

In particular in the above-described case, in which multiple motorcycles are located in one lane in front of the motor vehicle and these motorcycles drive with little distance from one another or overlapping/adjacent to one another, harmonic following of the motorcycle column can thereby be achieved even in the case of spontaneous or erratic acceleration behavior, which is typical for motorcycles, and/or undesired or uneven braking due to these usually dynamic motorcycle movements can be avoided.

This can moreover be achieved according to the above design of the controller or the driving assistance system, in particular because of the double function of the multi-object controller, without the first control instance or the person in front controller including parameterization having to be provided twice for this purpose.

A solution is thus proposed which can be implemented based on the above-described conventional controller design with relatively little additional securing and application expenditure.

It is conceivable that the predetermined first and/or the predetermined second object is in each case a single-track motor vehicle, in particular a motorcycle.

The first and the second acceleration controller can be designed to use in each case essentially the same parameterization for determining the first and the second setpoint acceleration.

The predetermined first and the predetermined second setpoint distance can have essentially the same value.

That is to say, the parameterization and the setpoint distance of the multi-object controller can correspond in the case of column driving to the parameterization and the setpoint distance of the person in front controller.

The driving assistance system can include a third acceleration controller, which is designed to determine a fourth setpoint acceleration of the motor vehicle based on a predetermined fourth setpoint distance of the motor vehicle to a predetermined fourth object, which drives on the same lane as the motor vehicle and in front of the predetermined first and the predetermined second object.

The control instance corresponding to the conventional second control instance, which can also be designated as the "in front of the person in front controller" can therefore also be provided, wherein this is provided for the vehicle in front of the vehicle in front (i.e., the next closest object to the motor vehicle in its driving tube).

The driving assistance system can include a second setpoint acceleration determination unit, which is designed to determine a fifth setpoint acceleration of the motor vehicle based on the first and the fourth setpoint acceleration.

The first setpoint acceleration determination unit can be designed to determine the setpoint acceleration to be output to the motor vehicle based on the fifth setpoint acceleration.

That is to say, a second setpoint acceleration determination unit can be connected upstream of the first setpoint acceleration determination unit, which receives as inputs the control variables or accelerations determined by the person in front controller and the in front of the person in front controller and outputs a further control variable to the first setpoint acceleration determination unit based thereon.

The first setpoint acceleration determination unit can be designed to determine the setpoint acceleration to be output to the motor vehicle based on a minimum selection.

The first setpoint acceleration determination unit can thus output the smallest received control variable or acceleration to the motor vehicle as the control variable.

The second acceleration controller can be designed to determine the second setpoint acceleration exclusively when no predetermined third object is present.

That is to say, the condition for the multi-object controller acting in the context of its double function as a second person in front controller can be that the multi-object controller currently does not have a neighboring lane object for control.

Furthermore, a motor vehicle, in particular an automobile, including the above-described driving assistance system is provided.

The description above with respect to the driving assistance system also applies similarly to the motor vehicle and vice versa.

The motor vehicle can include an object recognition unit connected to the driving assistance system, which is designed to recognize the predetermined objects in the surroundings of the motor vehicle.

At least one embodiment is described hereinafter with reference to FIGS. 1 and 2.

DETAILED DESCRIPTION OF THE DRAWINGS

Figure 1:
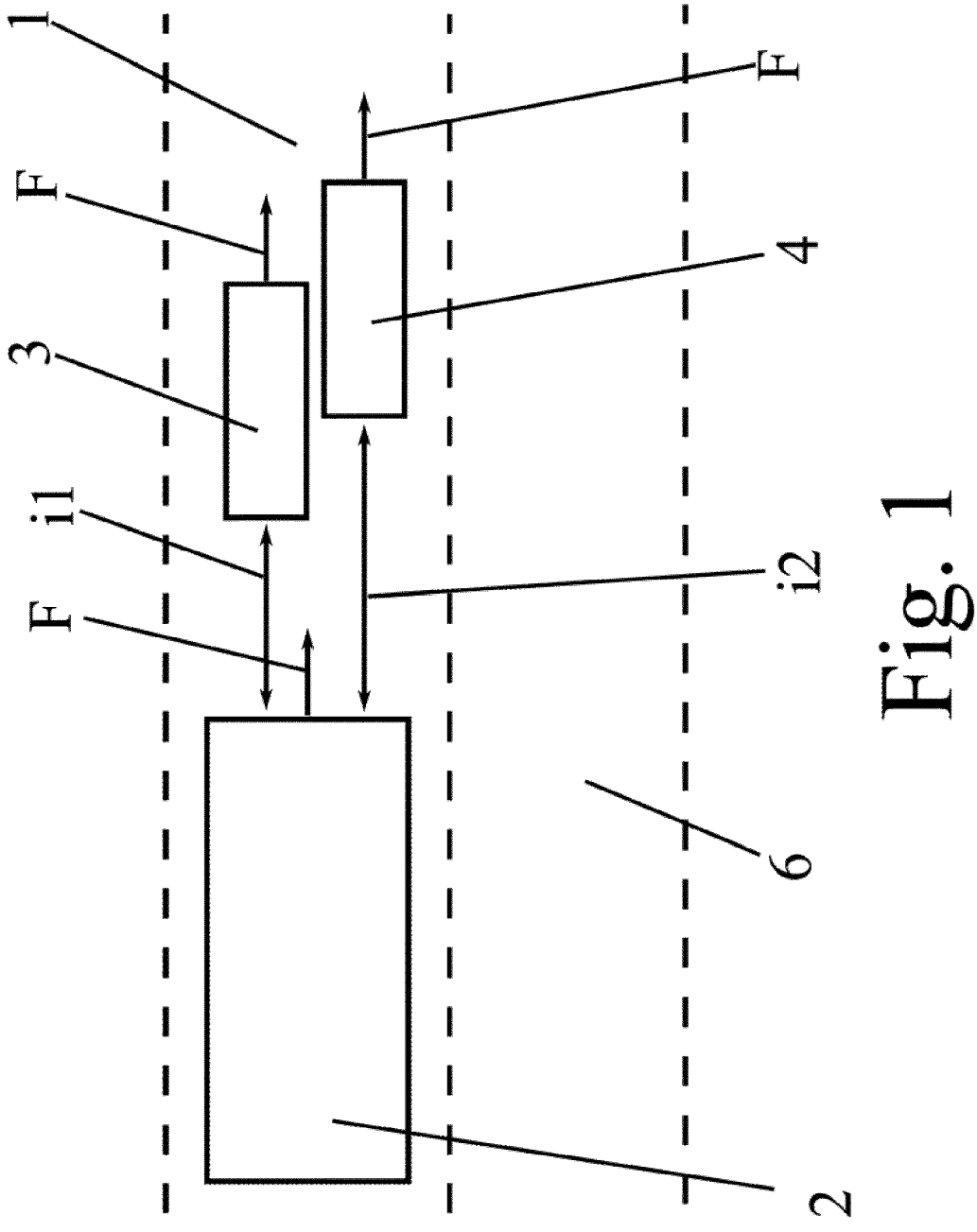
FIG. 1 schematically shows for explanation purposes a driving situation having a motor vehicle and two preceding objects essentially at the same level.

FIG. 1 shows a lane 1, on which a motor vehicle 2 is located having two objects driving in the driving direction F in front of the motor vehicle 2, which are each a single-track motor vehicle here, more precisely a motorcycle 3, 4. No motor vehicles are located on a further lane 6, which runs parallel to the lane 1.

Figure 2:
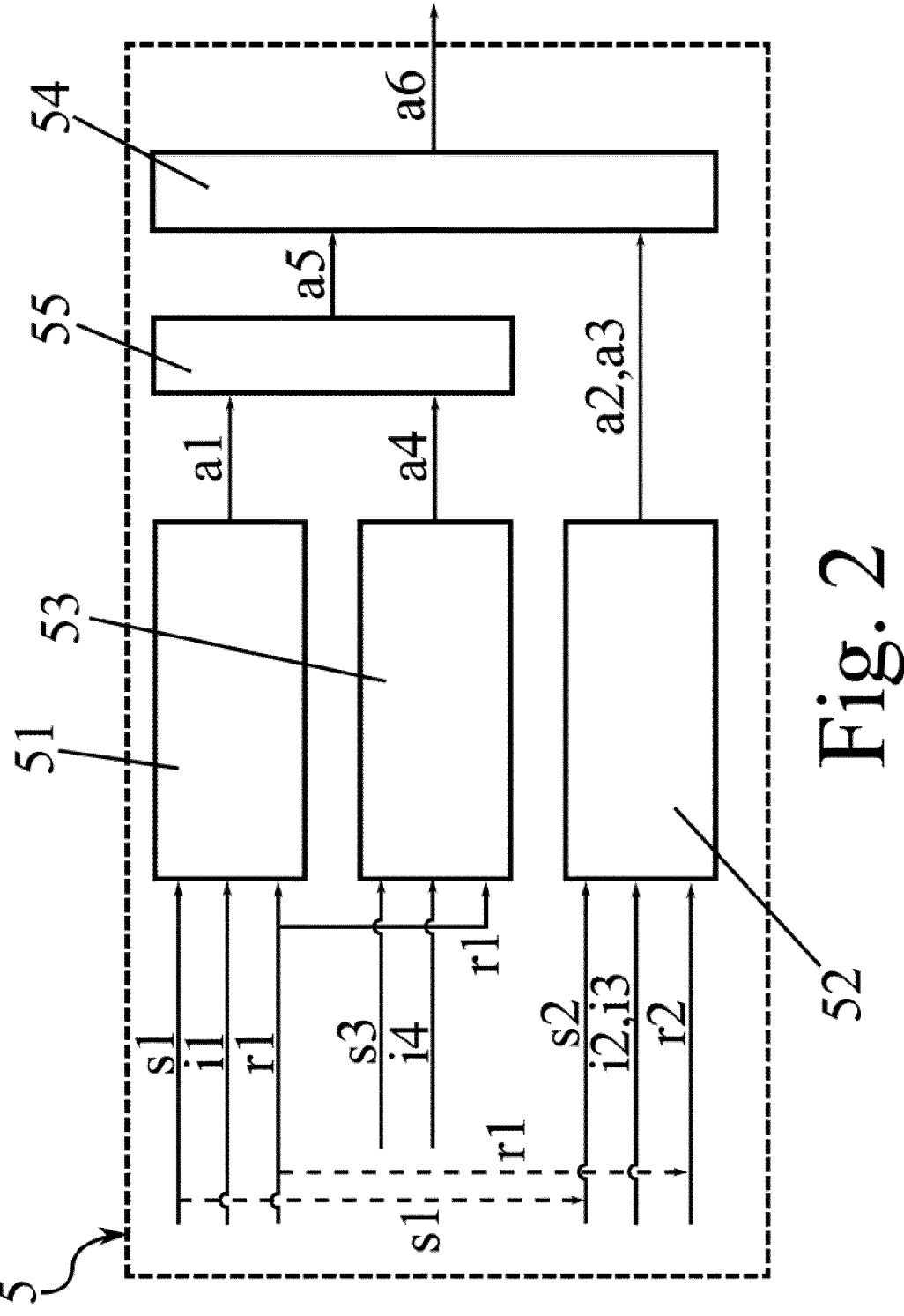
FIG. 2 shows a driving assistance system of the motor vehicle according to at least one embodiment.

The motor vehicle 2 includes the driving assistance system 5 schematically shown in FIG. 2, which is designed to control a longitudinal guidance of the motor vehicle 2 and thus a speed of the motor vehicle 2 in the driving direction F in an automated manner by output of a setpoint acceleration a6 to the motor vehicle 2.

For this purpose, the driving assistance system 5 includes three acceleration controllers 51, 52, 53. The first acceleration controller 51 is designated hereinafter as the person in front controller. The second acceleration controller 52 is designated hereinafter as the multi-object controller. The third acceleration controller 53 is designated hereinafter as the in front of the person in front controller.

The person in front controller 51 and the in front of the person in front controller 53 are connected via a second setpoint acceleration determination unit 55 to a first setpoint acceleration determination unit 54, to which the multi-object controller 52 is also connected.

In the situation shown in FIG. 1, the person in front controller 51 is designed, based on:
- a predetermined setpoint distance s1 of the motor vehicle 2 to the first motorcycle 3, which drives on the same lane 1 as the motor vehicle 2 and directly in front of the motor vehicle 2,
- an actual distance i1 of the first motorcycle 3 to the motor vehicle 2, and
- predetermined person in front controller parameters r1
- to determine a person in front controller acceleration a1 of the motor vehicle 2 and output it to the second setpoint acceleration determination unit 55.

In the situation shown in FIG. 1, since no motor vehicle is located on the further lane 6 here, the multi-object controller 52 is designed, based on:
- the predetermined setpoint distance s1 of the motor vehicle 2 to the second motorcycle 4, which drives on the same lane 1 as the motor vehicle 2 and at the level of the first motorcycle 3 in front of the motor vehicle 2,
- an actual distance i2 of the second motorcycle 4 to the motor vehicle 2, and
- the predetermined person in front controller parameters r1 of the person in front controller 51
- to determine a first multi-object controller acceleration a2 of the motor vehicle 2 and output it to the first setpoint acceleration determination unit 54.

In the case shown in FIG. 1 or in this driving situation, the person in front controller 51 and the multi-object controller 52 are thus designed in each case to use the identical or the same person in front controller parameters r1 for determining the person in front controller acceleration and the first multi-object controller acceleration a1, a2.

This also applies for the setpoint distance s1, which is used in each case by the person in front controller 51 and the multi-object controller 52 for determining the person in front controller acceleration and the multi-object controller acceleration a1, a2.

The motor vehicle 2 includes an object recognition unit (not shown) connected to the driving assistance system 5, which is designed to recognize the motorcycles 3, 4 in the surroundings of the motor vehicle 2, to determine the first and the second actual distance i1, i2, and to output them to the driving assistance system 5.

However, the multi-object controller 52 determines the first multi-object controller acceleration a2 only or exclusively when no predetermined object, a further motor vehicle here, is located on the further lane 6 in the surroundings of the motor vehicle 2.

However, if a further motor vehicle is located on the further lane 6 in the surroundings of the motor vehicle 2 or merges from this lane 6 onto the lane 1 (neither shown), the multi-object controller 52 is designed, based on:
- a predetermined setpoint distance s2 of the motor vehicle 2 to the further motor vehicle,
- an actual distance i3 to the further motor vehicle, and
- predetermined multi-object controller parameters r2,
- to determine a second multi-object controller acceleration a3 of the motor vehicle 2 and output it to the first setpoint acceleration determination unit 54.

In a situation (not shown) in which a further motor vehicle drives in front of the two motorcycles 3, 4, the in front of the person in front controller 53 is designed, based on:
- a predetermined setpoint distance s3 of the motor vehicle 2 to the further motor vehicle, which drives in front of the two motorcycles 3, 4,
- an actual distance i4 to the further motor vehicle, which drives in front of the two motorcycles 3, 4, and
- the predetermined person in front controller parameters r1,
- to determine an in front of the person in front controller acceleration a4 of the motor vehicle 2 and output it to the second setpoint acceleration determination unit 55.

The second setpoint acceleration determination unit 55 is designed to determine a setpoint acceleration a5 of the motor vehicle 2 based on the person in front controller acceleration a1 and the in front of the person in front controller acceleration a4 and output it to the first setpoint acceleration determination unit 54.

The first setpoint acceleration determination unit 54 is designed to determine the setpoint acceleration a6 to be output to the motor vehicle based on a minimum selection from the first multi-object controller acceleration a2 or the second multi-object controller acceleration a3 and the setpoint acceleration a5 determined by the second setpoint acceleration determination unit 54.

LIST OF REFERENCE SIGNS 1 lane
2 motor vehicle
3 first motorcycle
4 second motorcycle
5 driving assistance system
51 person in front controller
52 multi-object controller
53 in front of the person in front controller
54 first setpoint acceleration determination unit
55 second setpoint acceleration determination unit
6 further lane
a1 person in front controller acceleration
a2 first multi-object controller acceleration
a3 second multi-object controller acceleration
a4 in front of the person in front controller acceleration a5 setpoint acceleration determined by the second setpoint acceleration determination unit a6 setpoint acceleration to be output to the motor vehicle F driving direction i1 actual distance of the first motorcycle i2 actual distance of the second motorcycle i3 actual distance of the further motor vehicle on the further lane i4 actual distance of the further motor vehicle in front of the two motorcycles r1 person in front controller parameters r2 multi-object controller parameters s1 setpoint distance of the motor vehicle to the first or second motorcycle s2 setpoint distance of the motor vehicle to the further motor vehicle on the further lane s3 setpoint distance of the motor vehicle to the further motor vehicle in front of the two motorcycles

What is claimed is:

1. A driving assistance system for a motor vehicle, wherein the driving assistance system controls a longitudinal guidance of the motor vehicle in an automated manner by outputting a setpoint acceleration to the motor vehicle, the driving assistance system comprising:

a first acceleration controller configured to determine a first setpoint acceleration of the motor vehicle based on a predetermined first setpoint distance of the motor vehicle to a predetermined first object in a same lane as the motor vehicle and directly in front of the motor vehicle, and a second acceleration controller configured to:

determine a second setpoint acceleration of the motor vehicle based on a predetermined second setpoint distance of the motor vehicle to a predetermined second object in the same lane as the motor vehicle and at a same level of the predetermined first object, and determine a third setpoint acceleration of the motor vehicle based on a predetermined third setpoint distance of the motor vehicle to a predetermined third object, wherein the third object is in a different lane than the motor vehicle and/or changes from the different lane to the same lane as the motor vehicle, wherein the driving assistance system determines, based on the first setpoint acceleration, the second setpoint acceleration, and the third setpoint acceleration, the setpoint acceleration output to the motor vehicle.

2. The driving assistance system of claim 1, wherein the first object and/or the second object is, in each case, a single-track motor vehicle.

3. The driving assistance system of claim 1, wherein the first acceleration controller and the second acceleration controller each use a same parameterization for determining the first setpoint acceleration and the second setpoint acceleration.

4. The driving assistance system of claim 1, wherein the first setpoint distance and the second setpoint distance have the same value.

5. The driving assistance system of claim 1, further comprising:

a third acceleration controller configured to determine a fourth setpoint acceleration of the motor vehicle based on a predetermined fourth setpoint distance of the motor vehicle to a predetermined fourth object in the same lane as the motor vehicle and in front of the first object and the second object.

6. The driving assistance system according to claim 5, wherein the driving assistance system determines a fifth setpoint acceleration of the motor vehicle based on the first setpoint acceleration and the fourth setpoint acceleration, and wherein the driving assistance system determines the setpoint acceleration output to the motor vehicle based on the fifth setpoint acceleration.

7. The driving assistance system of claim 1, wherein the driving assistance system determines the setpoint acceleration output to the motor vehicle based on a minimum selection.

8. The driving assistance system of claim 1, wherein the second acceleration controller determines the second setpoint acceleration exclusively when no predetermined third object is present.

9. A motor vehicle, comprising:

a driving assistance system that controls a longitudinal guidance of the motor vehicle in an automated manner by outputting a setpoint acceleration to the motor vehicle, wherein the driving assistance system comprises:

a first acceleration controller configured to determine a first setpoint acceleration of the motor vehicle based on a predetermined first setpoint distance of the motor vehicle to a predetermined first object in a same lane as the motor vehicle and directly in front of the motor vehicle, and a second acceleration controller configured to:

determine a second setpoint acceleration of the motor vehicle based on a predetermined second setpoint distance of the motor vehicle to a predetermined second object in the same lane as the motor vehicle and at a same level of the predetermined first object, and determine a third setpoint acceleration of the motor vehicle based on a predetermined third setpoint distance of the motor vehicle to a predetermined third object, wherein the third object is in a different lane than the motor vehicle and/or changes from the different lane to the same lane as the motor vehicle, wherein the driving assistance system determines, based on the first setpoint acceleration, the second setpoint acceleration, and the third setpoint acceleration, the setpoint acceleration output to the motor vehicle.

10. The motor vehicle of claim 9, wherein the motor vehicle recognizes the predetermined objects in the surroundings of the motor vehicle.

* * * * *